United States Patent
Hada (10) Patent No.: US 8,536,994 B2
(45) Date of Patent: Sep. 17, 2013

(54) VEHICLE WARNING SYSTEMS AND METHODS

(75) Inventor: Hiedki Hada, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 827 days.

(21) Appl. No.: 12/481,611

(22) Filed: Jun. 10, 2009

(65) Prior Publication Data

US 2010/0315216 A1 Dec. 16, 2010

(51) Int. Cl.
*B60Q 1/00* (2006.01)
*B60Q 1/26* (2006.01)
*B60Q 1/52* (2006.01)
*B60Q 1/44* (2006.01)
*G05D 1/02* (2006.01)
*G06F 17/10* (2006.01)

(52) U.S. Cl.
USPC ........... 340/436; 340/435; 340/468; 340/471; 340/479; 701/300; 701/301

(58) Field of Classification Search
None
See application file for complete search history.

(56) References Cited

U.S. PATENT DOCUMENTS

| | | | | |
|---|---|---|---|---|
| 4,600,913 A | * | 7/1986 | Caine | 340/435 |
| 4,808,968 A | * | 2/1989 | Caine | 340/479 |
| 5,162,794 A | | 11/1992 | Seith | |
| 5,594,414 A | | 1/1997 | Namngani | |
| 6,225,918 B1 | * | 5/2001 | Kam | 340/903 |
| 6,388,580 B1 | * | 5/2002 | Graham | 340/903 |
| 6,590,495 B1 | * | 7/2003 | Behbehani | 340/435 |
| 7,057,501 B1 | | 6/2006 | Davis | |
| 7,068,159 B2 | | 6/2006 | Ko | |
| 2006/0028328 A1 | * | 2/2006 | Cresse | 340/435 |
| 2006/0164221 A1 | * | 7/2006 | Jensen | 340/435 |
| 2007/0008095 A1 | * | 1/2007 | Gwinn et al. | 340/476 |
| 2008/0122652 A1 | | 5/2008 | Tengler et al. | |
| 2009/0134987 A1 | * | 5/2009 | Oltmann et al. | 340/435 |
| 2009/0256698 A1 | * | 10/2009 | Bonilla | 340/479 |

* cited by examiner

*Primary Examiner* — Julie Lieu
(74) *Attorney, Agent, or Firm* — Dinsmore & Shohl LLP (57) ABSTRACT

A collision detection unit mounts to a host vehicle. The collision detection unit includes a housing and a stop lamp associated with the housing and visible from outside the housing. A warning lamp is associated with the housing and is visible from outside the housing. A sensor is associated with the housing and is configured to detect an object.

17 Claims, 4 Drawing Sheets

VEHICLE WARNING SYSTEMS AND METHODS

TECHNICAL FIELD

The present specification generally relates to vehicle warning systems and methods and, more specifically, to vehicle warning systems and methods for alerting vehicles of a potential collision when predetermined conditions are met.

BACKGROUND

Motor vehicles may come equipped with one or more collision detecting systems, which may help predict and warn of a potential collision, for example, with another vehicle. Such collision systems may be "front end" collision detecting systems, which detect objects in front of the host vehicle or "rear-end" collision detecting systems, which detect objects behind the host vehicle.

Some reports indicate that approximately 25 percent of all reported traffic accidents are rear-end crashes. It is desirable to reduce and/or mitigate such rear-end crashes. While it is generally known to locate a sensor, for example, at the rear bumper for detecting an object approaching the host vehicle, other collision detecting systems are desirable.

SUMMARY

In one embodiment, a collision detection unit mounts to a host vehicle. The collision detection unit includes a housing and a stop lamp associated with the housing and visible from outside the housing. A warning lamp is associated with the housing and is visible from outside the housing. A sensor is associated with the housing and is configured to detect an object.

In another embodiment, a vehicle includes a rear windshield and a collision detection unit mounted at the rear windshield. The collision detection unit includes a housing and a stop lamp mounted in the housing and visible from outside the vehicle. A warning lamp is mounted in the housing and visible from outside the vehicle. A sensor is mounted in the housing. The sensor is configured to detect an object located behind the vehicle. A processing unit is configured to activate the warning lamp based on input from the sensor.

In yet another embodiment, a method of warning a following vehicle from a host vehicle of a potential collision is provided. The method includes detecting the following vehicle using a sensor; determining a speed between the following vehicle and the host vehicle using a processing unit; determining a distance between the following vehicle and the host vehicle using the processing unit; and warning the following vehicle if a threshold criteria is met by activating a warning lamp using the processing unit; wherein the sensor, processing unit and warning lamp are all mounted in a housing mounted to the host vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
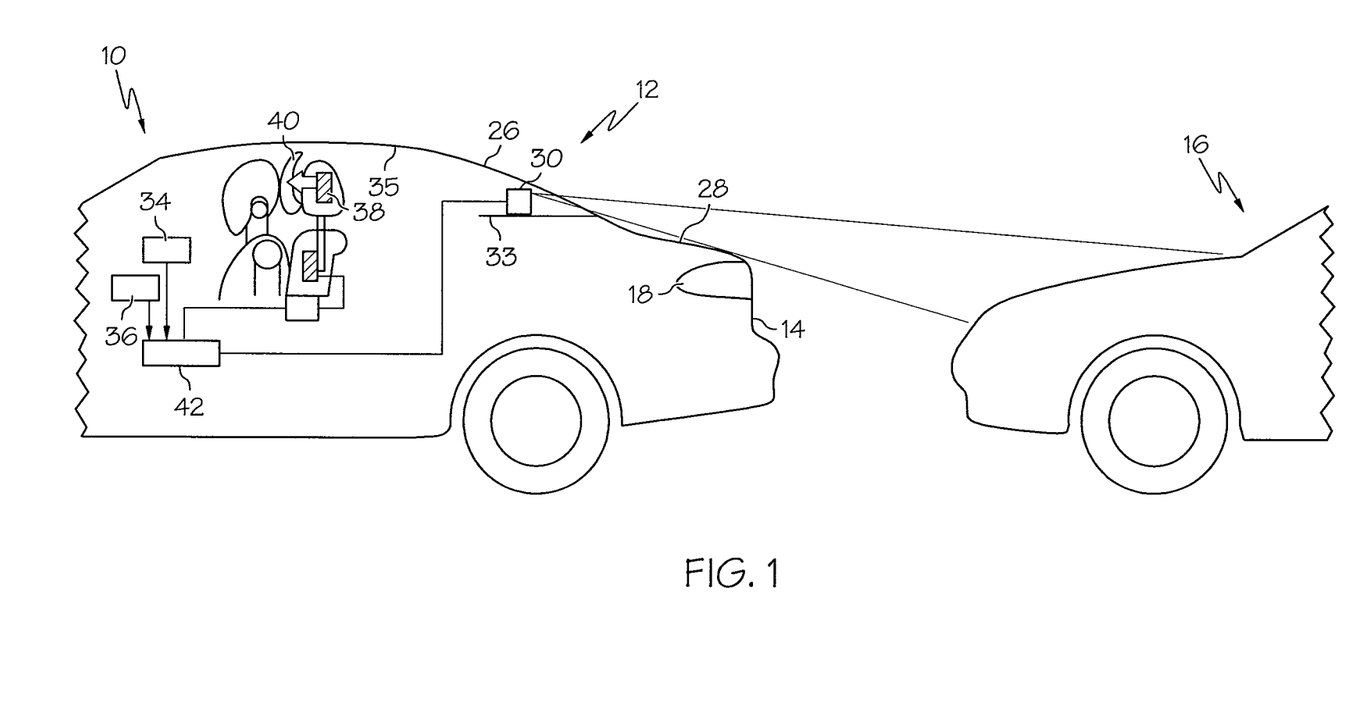
FIG. 1 is a diagrammatic side view of a host vehicle including an embodiment of a collision detection system detecting a following vehicle.

FIG. 1 generally depicts one embodiment of a host vehicle 10 including a collision detection system, generally referred to as element 12. In the illustrated embodiment, the collision detection system 12 detects objects, such as vehicle 16, located at a rear-end 14 of the host vehicle. Various embodiments of the collision detection system 12 and the operation of the collision detection system will be described in more detail herein.

Figure 2:
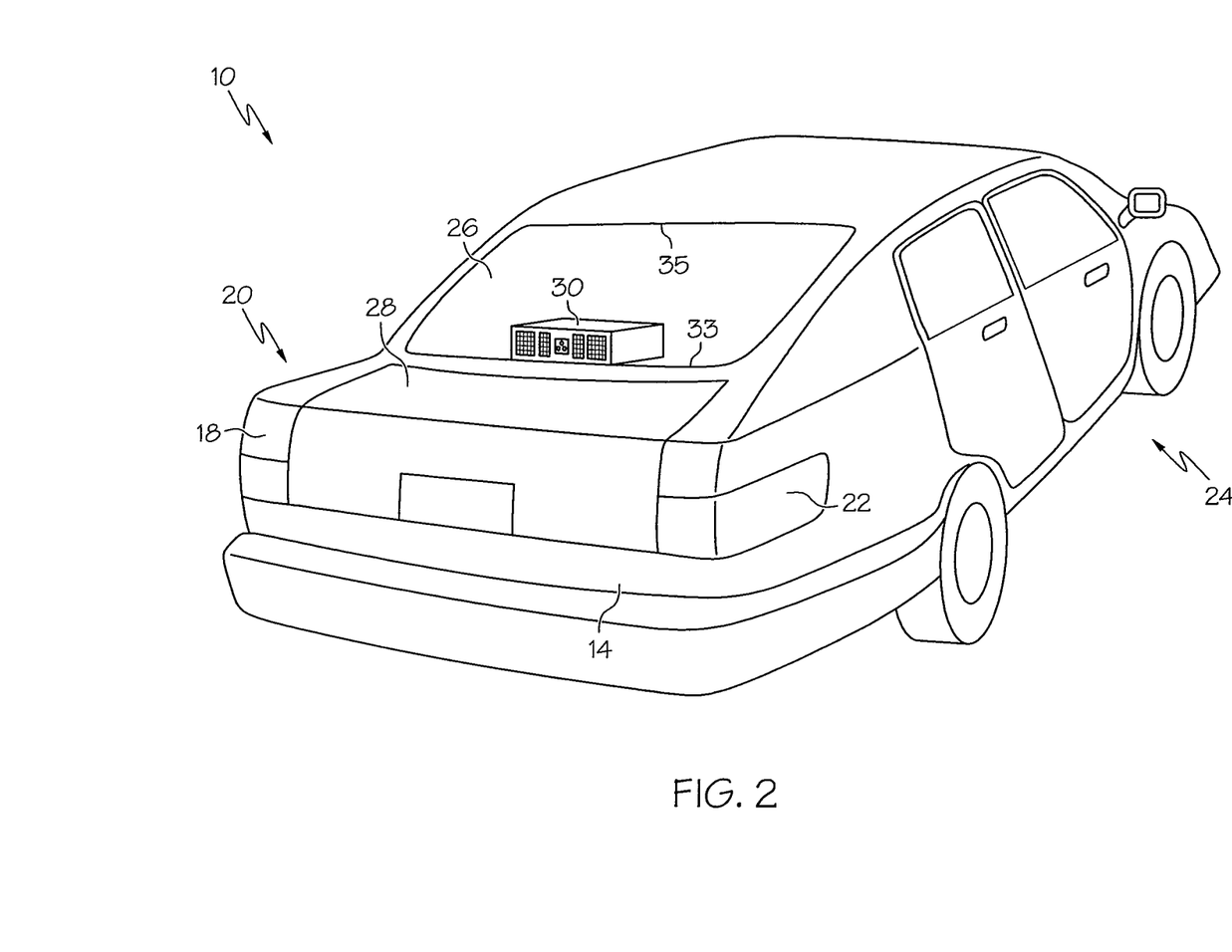
FIG. 2 is a perspective rear view of the host vehicle of FIG. 1 including the collision detection system.

Referring to FIGS. 1 and 2, the host vehicle 10 includes the rear-end 14 including a first lamp set 18 located at a first lateral side 20 and a second lamp set 22 located at an opposite lateral side 24. Any suitable configuration may be utilized for the lamp sets 18 and 22, such as a tail lamp, a stop and tail lamp, a turn signal lamp, a back up lamp, etc. The lamp sets 18 and 22 may be a single unit type or multi-unit type. The lamp sets 18 and 22 may include cover lenses, back panels, light emitting devices, wires, sockets, connectors, reflectors, etc.

Located above the lamp sets 18 and 22 and at a rear windshield 26 (e.g., above closed trunk lid 28) is an integrated rear-end collision detection unit 30. In some embodiments, the integrated rear-end collision detection unit 30 may be located at about where a high mount stop lamp set is located. The integrated rear-end collision detection unit 30 may be mounted at the upper middle or lower middle of the rear windshield 26 or on the trunk lid 28, among other locations. In the illustrated embodiment, the integrated rear-end collision detection unit 30 is mounted at the lower middle of the rear windshield 26. The integrated rear-end collision detection unit 30 may be mounted behind (i.e., within the interior of the host vehicle 10), in front of (e.g., outside the interior of the host vehicle) or partially behind and in front of the rear windshield 26. With the integrated rear-end collision detection unit 30 mounted at least partially behind (within the interior) the host vehicle 10, the integrated rear-end collision detection unit may be mounted upon a rear dash surface 33 or on a roof 35 of the host vehicle. In the illustrated embodiment, only a rear portion of the integrated rear-end collision detection unit 30 is mounted behind the rear windshield 36 with a front portion being located outside the interior of the host vehicle 10.

Referring particularly to FIG. 1, the integrated rear-end collision detection unit 30 detects information regarding the positional relationship between the host vehicle 10 and a following vehicle 16 (or other object), such as relative speed, relative distance, orientation of the following vehicle with respect to the host vehicle, etc. In some embodiments, the integrated rear-end collision detection unit 30 may be connected to other vehicle systems, such as a steering angle sensor 34 for determining steering angle, a vehicle speed sensor 36 for determining vehicle speed, a headrest control apparatus 38 for controlling operation of an active headrest 40, airbag control systems, etc. In some embodiments, the integrated collision detection unit 30 may be connected to an electronic control unit 42, which in turn may be connected and control one or more of the various other vehicle systems based, at least in part, information received from the integrated rear-end collision detection unit.

Figure 3:
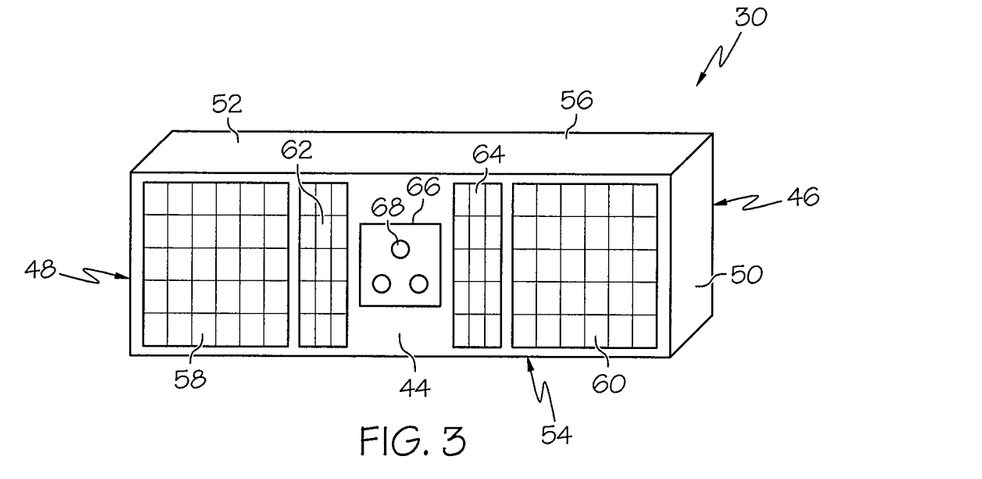
FIG. 3 is a diagrammatic front view of an embodiment of an integrated rear-end collision detection unit for use in the collision detection system of FIG. 1.

Referring now to FIG. 3, the integrated rear-end collision detection unit 30 may include a rearward facing side 44 that faces the following vehicle 16, a frontward facing side 46 opposite the rearward facing side that faces toward the front of the host vehicle 10, front-to-back sides 48 and 50 and top and bottom surfaces 52 and 54. In some embodiments, any one or more of the rearward facing side 44, frontward facing side 46, front-to-back sides 48 and 50 and top and bottom surfaces 52 and 54 may include mounting structure (e.g., holes, brackets, slots, ribs, fasteners, etc.) for mounting the integrated rear-end collision detection unit 30 to corresponding mounting structure on the host vehicle 10.

A housing 56 provides a protective enclosure for housing components of the integrated rear-end collision detection unit 30. The housing 56 may be formed of multiple housing parts that together form the protective enclosure. The housing 56 may be formed of any suitable material such as plastic and/or metal and formed by any suitable process or combination of processes such as stamping, machining, molding, drawing, extruding, etc. While the housing 56 is illustrated as being somewhat box-shaped, it may be any other suitable shape such as rounded and/or having more or less than the illustrated six sides.

Located at the rearward facing side 44 are a first center high-mount stop lamp set 58 and a second center high-mount stop lamp set 60. The center high-mount stop lamp sets 58 and 60 may be a single unit type or multi-unit type. The center high-mount stop lamp sets 58 and 60 may include cover lenses, back panels, light emitting devices, wires, sockets, connectors, reflectors, etc. The center high-mount stop lamp sets 58 and 60 may be red or orange in color and provide other drivers with an enhanced stop or brake warning signal to the following vehicle 16.

To an inside of the center high-mount stop lamp sets 58 and 60 are warning lamp sets 62 and 64. The warning lamp sets 62 and 64 have a brightness when illuminated to warn the following vehicle 16 within a detection zone behind the host vehicle 10. The warning lamp sets 62 and 64 may be a single unit type or multi-unit type. The warning lamp sets 62 and 64 may include cover lenses, back panels, light emitting devices, wires, sockets, connectors, reflectors, etc. The warning lamp sets 62 and 64 may be a color different than the center high-mount lamp sets 58 and 60, such as white, to provide a warning other than a braking or stopping warning to the following vehicle 16.

To an inside of the warning lamp sets 62 and 64, is a rearward sensor unit 66 that includes a rearward sensor 68 for detecting the following vehicle 16 (or other object). The rearward sensor 68 may use, for example, radio waves (e.g., millimeter waves), optical waves (e.g., laser waves) or ultra sound waves as detection waves for detecting the state of the following vehicle. In some embodiments, the rearward sensor 68 is a laser range sensor having a width and length of detection (i.e., the detection zone) that is suitable for detecting the following vehicle 16, such as approximately one lane width (e.g., about 3.5 meters) and a distance of about 150 to about 500 meters, e.g., between about 150 to about 200 meters from the rear-end 14 of the host vehicle 10.

Figure 4:
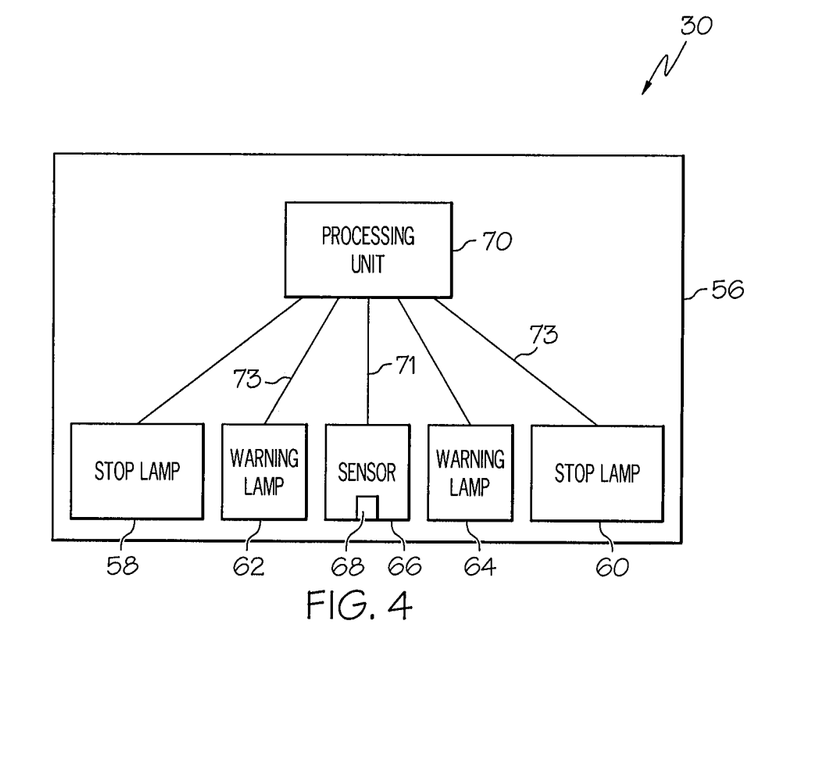
FIG. 4 is a schematic illustration of the integrated rear-end collision detection system of FIG. 3.

FIG. 4 shows, schematically, the integrated rear-end detection unit 30. The housing 56 contains the center high-mount stop lamp sets 58 and 60, the warning lamp sets 62 and 64 and the rearward sensor unit 66 that includes the rearward sensor 68. A processing unit 70 receives detection signals 71 from the rearward sensor unit 66 and includes logic for determining relative speed, relative distance, orientation of the following vehicle with respect to the host vehicle, etc. The processing unit 70 also controls using control signals 73 the center high-mount stop lamp sets 58 and 60 and the warning lamp sets 62 and 64. In some embodiments, the processing unit 70 may control the warning lamp sets 62 and 64 based on signals received from the rearward sensor unit 66 and may control the center high-mount stop lamp sets 58 and 60 based on braking information of the host vehicle, for example, received from the electronic control unit 42 (FIG. 1).

Figure 5:
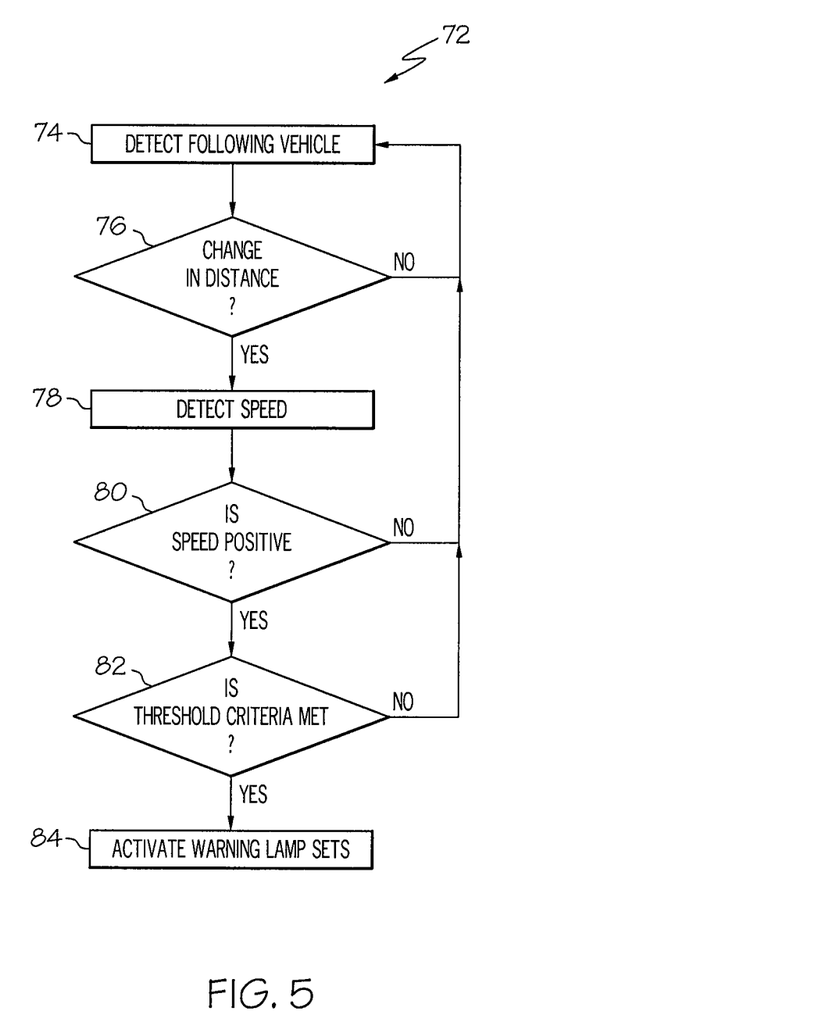
FIG. 5 is an embodiment of a process for warning a following vehicle of a potential collision using the integrated rear-end collision detection unit of FIG. 3.

Referring to FIG. 5, an exemplary process 72 for warning a driver of the following vehicle 16 using the integrated rear-end collision detection unit 30 includes detecting the existence of and distance to the following vehicle 16 once the following vehicle enters the detection zone of the host vehicle 10 at step 74. At step 76, the processing unit 70 determines whether a change in distance occurs between the host vehicle 10 and the following vehicle 16. If there is no change in distance between the host vehicle 10 and the following vehicle 16, the processing unit 70 continues to check for a change in distance. If there is a change in distance between the host vehicle 10 and the following vehicle 16, the processing unit 70 determines the speed difference between the host vehicle 10 and the following vehicle 16 at step 78. At step 80, the processing unit 70 determines whether the speed difference is a positive value (i.e., the host and following vehicles are moving closer together) or a negative value (i.e., the host and following vehicles are moving further apart). If the processing unit 70 determines that the speed difference is negative (or that the host and following vehicles are moving further apart), the processing unit continues to check for a change in distance until the following vehicle 16 falls outside the detection zone. If the processing unit 70 determines that the speed difference between the host vehicle 10 and the following vehicle 16 is positive (or that the host and following vehicles are moving closer together), the processing unit 70 uses the distance information and the speed information to determine whether a threshold criteria has been met at step 82. If the threshold criteria has not been met, the processing unit 70 continues to check for a change in distance. If the threshold criteria has been met, the processing unit 70 activates the warning lamp sets 62 and 64 at step 84. The threshold criteria determines whether to issue a warning to the following driver and may include speed and distance values and may be set based on, for example, vehicle characteristics, driver capability and driving conditions. The threshold criteria may be preset, for example, by the manufacturer, or it may be dynamic. For example, rain sensors, light sensors, etc. may be employed to adjust the threshold criteria depending on real-time driving conditions or the host driver may be able to adjust the threshold criteria. In some embodiments, the threshold criteria may be selected to provide at least about two seconds of reaction time for the following vehicle 16 to make an adjustment (e.g., decelerate or evasive maneuver) before a collision.

In some embodiments, the warning lamp sets 62 and 64 may flash or blink when providing a warning signal. The warning lamp sets 62 and 64 may flash ON/OFF together or in sequence. In some embodiments, the processing unit 70 may control frequency of flashing, for example, depending on the magnitude of the relative speed difference and/or the relative distance between the host vehicle 10 and the following vehicle 16.

The above-described integrated rear-end collision detection unit 30 provides a self-contained package having the processing unit 70, the center high-mount stop lamp sets 58 and 60, the warning lamp sets 62 and 64 and the rearward sensor unit 66 including the rearward sensor 68 all integrated within the same housing 56. Such an integration of component into the same housing 56 can provide increased flexibility as compared to having various components spread apart throughout the vehicle. Location of the rearward sensor unit 66 at a higher position above the trunk lid can reduce malfunction, for example, due to obstructions near the road as compared to lower mounted sensors (e.g., around the bumper). The integrated packaging can reduce data communication and processing load of the processing unit 70 because sensing, processing and activation are all executed by the integrated rear-end collision detection unit 30.

While warning lamp sets 62 and 64 are described above, other warning signals may be provided to the following vehicle 16 and/or to the host vehicle 10. For example, an audible sound may be provided to warn the following vehicle 16 and/or the host vehicle 10. In some embodiments, the integrated rear-end collision detection unit 30 may include a transmitter that can transmit a warning signal that can be detected by the following vehicle 16 and/or host vehicle 10. Lights may be provided within the host vehicle 10 and/or following vehicle that illuminate based on a signal from the integrated rear-end collision detection unit 30. In some embodiments, the integrated rear-end collision detection unit 30 may include a receiver, for example, to receive information from a global positioning satellite or other source, such as from the following vehicle 16.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A collision detection unit that mounts to a host vehicle, the collision detection unit comprising:
    a housing;
    a stop lamp associated with the housing and visible from outside the housing, the stop lamp configured to display a first color;
    a warning lamp associated with the housing and visible from outside the housing, the warning lamp configured to display a second color different from the first color;
    a sensor associated with the housing, the sensor configured to detect an object and to provide a signal indicative of distance between the object and the host vehicle; and
    a processing unit located in the housing that, based on the signal, (a) determines a change in distance between the host vehicle and the object, (b) if there is a change in distance in step (a), determines a speed difference between the host vehicle and the object, and (c) compares the change in distance and the speed difference to threshold criteria;
    wherein the processing unit activates the warning lamp to display the second color based on the comparison of the change in distance and the speed difference to the threshold criteria;
    wherein the processing unit activates the stop lamp to display the first color based on information other than the comparison of the change in distance and the speed difference to the threshold criteria.

2. The collision detection unit of claim 1, wherein at least one of the stop lamp, warning lamp, sensor and processing unit is mounted at least partially within the housing.

3. The collision detection unit of claim 1, wherein the stop lamp has a first light source and the warning lamp has a second light source different from the first light source.

4. The collision detection unit of claim 1, wherein the sensor is a laser range sensor.

5. A vehicle, comprising:
    a rear windshield;
    a collision detection unit mounted at the rear windshield, the collision detection unit comprising:
        a housing;
        a stop lamp mounted in the housing and visible from outside the vehicle, the stop lamp configured to display a first color;
        a warning lamp mounted in the housing and visible from outside the vehicle, the warning lamp configured to display a second color different from the first color;
        a sensor mounted in the housing, the sensor configured to detect an object located behind the vehicle and to provide a signal indicative of distance between the object and the host vehicle; and
        a processing unit that, based on the signal, (a) determines a change in distance between the host vehicle and the object, (b) if there is a change in distance in step (a), determines a speed difference between the host vehicle and the object, and (c) compares the change in distance and the speed difference to threshold criteria;
    wherein the processing unit activates the warning lamp to display the second color based on the comparison of the change in distance and the speed difference to the threshold criteria;
    wherein the processing unit activates the stop lamp to display the first color based on information other than the comparison of the change in distance and the speed difference to the threshold criteria.

6. The vehicle of claim 5, wherein the stop lamp has a first light source and the warning lamp has a second light source different from the first light source.

7. The vehicle of claim 5, wherein the processing unit is mounted in the housing, the stop lamp, warning lamp, sensor and processing unit being installed to the vehicle within the housing.

8. The vehicle of claim 5, wherein the sensor is a laser range sensor.

9. The vehicle of claim 5, wherein the stop lamp is a first stop lamp, the collision detection unit further comprising a second stop lamp spaced-apart from the first stop lamp.

10. The vehicle of claim 9, wherein the warning lamp is a first warning lamp, the collision detection unit further comprising a second warning lamp spaced-apart from the first stop lamp.

11. The vehicle of claim 5 further comprising an electronic control unit located outside the housing and connected to the processing unit.

12. The vehicle of claim 5 further comprising a vehicle speed sensor located outside the housing, the vehicle speed sensor configured provide vehicle speed information to the processing unit.

13. A method of warning a following vehicle from a host vehicle of a potential collision, the method comprising:
  detecting the following vehicle using a sensor;
  determining a change in distance between the following vehicle and the host vehicle using a processing unit;
  determining the change in distance, if there is a change in distance determining a speed difference between the following vehicle and the host vehicle using the processing unit;
  comparing the speed difference between the following vehicle and the host vehicle and the distance between the following vehicle and the host vehicle to threshold criteria using the processing unit;
  warning the following vehicle if the threshold criteria is met by activating a warning lamp using the processing unit; and
  indicating a braking operation by activating a stop lamp mounted within a housing using the processor based on information other than the comparison between the speed difference between the following vehicle and the host vehicle;
  wherein the sensor, processing unit and warning lamp are mounted in the housing mounted to the host vehicle;
  wherein the stop lamp displays a first color when activated and the warning lamp displays a second color different from the first color when activated.

14. The method of claim 13, wherein the stop lamp is a first stop lamp, the collision detection unit further comprising a second stop lamp spaced-apart from the first stop lamp.

15. The method of claim 13, wherein the warning lamp is a first warning lamp, the collision detection unit further comprising a second warning lamp spaced-apart from the first warning lamp.

16. The method of claim 13 further comprising an electronic control unit located outside the housing and connected to the processing unit.

17. The method of claim 13 further comprising a vehicle speed sensor located outside the housing providing vehicle speed information to the processing unit.

* * * * *

UNITED STATES PATENT AND TRADEMARK OFFICE
CERTIFICATE OF CORRECTION

PATENT NO. : 8,536,994 B2
APPLICATION NO. : 12/481611
DATED : September 17, 2013
INVENTOR(S) : Hideki Hada

Page 1 of 1

It is certified that error appears in the above-identified patent and that said Letters Patent is hereby corrected as shown below:

On the Title Page

Item (75) Inventor: Change "Hiedki Hada" to --Hideki Hada--.

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,536,994 B2 | Page 1 of 1 |
| APPLICATION NO. | : 12/481611 | |
| DATED | : September 17, 2013 | |
| INVENTOR(S) | : Hada | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this
Thirty-first Day of March, 2015

Michelle K. Lee
*Director of the United States Patent and Trademark Office*